Nov. 9, 1948.  J. M. PETERS  2,453,262
CHUCK

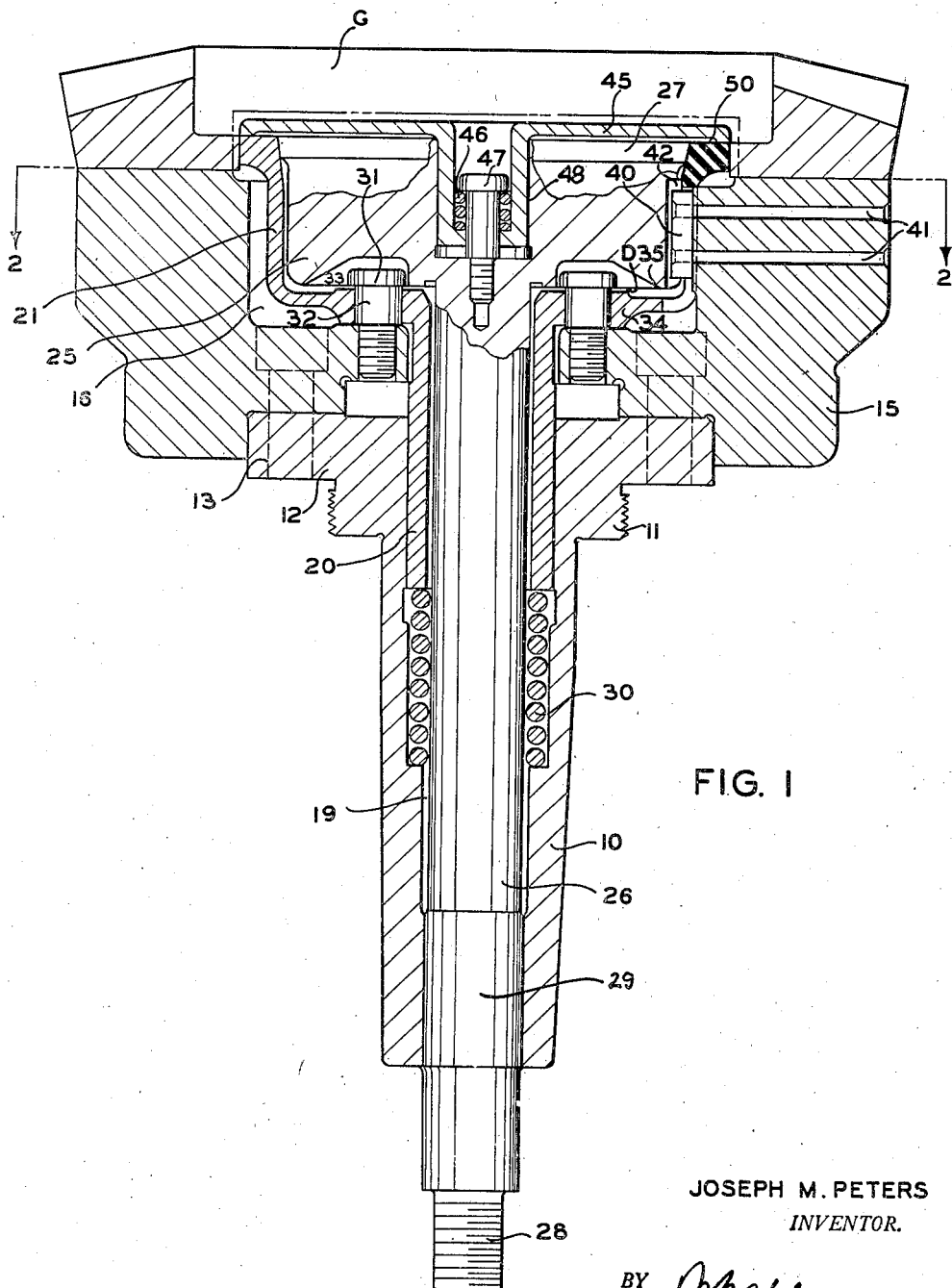

Filed April 1, 1946  2 Sheets-Sheet 2

JOSEPH M. PETERS
*INVENTOR.*

BY

Patented Nov. 9, 1948

2,453,262

UNITED STATES PATENT OFFICE 2,453,262

CHUCK

Joseph M. Peters, Irondequoit, N. Y., assignor to Gleason Works, Rochester, N. Y., a corporation of New York Application April 1, 1946, Serial No. 658,628

13 Claims. (Cl. 279—2)

The present invention relates to chucks and more particularly to collet chucks of the expanding type. In a still more specific aspect, the invention relates to collet type chucks for securing gear blanks or gears on cutting, grinding, lapping, burnishing, shaving, or testing machines and the like on which work is to be done upon a gear or gear blank.

The type of chuck conventionally used on machines of the type referred to has a clamping plate, which engages the front face of the gear or gear blank, and a drawbar, which is operated to pull the clamping plate rearwardly to clamp the gear or blank against the arbor or spindle on which it is mounted. With this type of chuck, in order to remove a gear or blank from the arbor or spindle, after the work on it has been completed, it is necessary first to remove the clamping plate. Moreover, when a new work piece is positioned on the arbor or spindle, it is necessary to replace the plate before the work piece can be chucked.

This clamping plate is a nuisance. If it is being used on a gear cutting machine, fine chips get on it. These frequently cut the fingers of the operator in handling the plate, which is an annoyance; and the cuts are always liable to infect. In any event, it takes time to remove the plate and to replace it. Moreover, on a production job, where the operator has to take the plate off and put it on repeatedly in the course of a day, the handling becomes quite burdensome and fatiguing.

Furthermore, with the conventional type chuck, the bore of the work has to be made quite accurate in diameter in order that the work may be held securely. This is true even where the gear is being rough-cut. The work has to be centered on the arbor or spindle by its bore. The accuracy required in the bore adds to the expense of gear manufacture.

Besides this, in a conventional type chuck, it is usually necessary to provide a stripper or push-off device to remove the gear, when the work is completed, from the arbor or spindle because of the close fit of the bore of the gear on the arbor or spindle.

For all of these reasons, expansible type collet chucks have been proposed for use in chucking gears, for chucks of this type can be so constructed that when they are in collapsed position, the work may be taken off or put on without removing any part of the chuck. Moreover, the bore of the work does not have to be made quite so accurate when a collet type chuck is used, since the expansion of the gripping fingers of the collet allows for a considerable variation in diameter of the bore of the work to be chucked.

Collet type chucks, as heretofore constructed, however, have not proved too satisfactory for gear work. Difficulties have always been experienced in keeping chips, dirt and grit from between the griping fingers of the chuck; and if chips or dirt or grit get in between the fingers, the chuck will not operate properly. Moreover, with the designs heretofore built, there has always been the danger of a careless operator ruining a collet by pulling the drawbar back and expanding the collet fingers without having first put a workpiece in place on the chuck. If the operator does this, the collet fingers are expanded beyond the limit to which they should be expanded; and they may be permanently warped. With previous designs of collet chucks, moreover, there is nothing to insure proper centering of the work with reference to the axis of the spindle on which it is to be chucked; in the act of clamping the work, the collet fingers may chuck the work eccentrically of the spindle. This, of course, will introduce errors in the work done. A further disadvantage with previous designs of collet type chucks has been the difficulty of holding the work against turning or twisting on the work spindle or arbor under the thrusts of the cutter, where the chuck is used on a gear cutting machine, particularly where spiral bevel or hypoid gears are being cut, or under the thrusts caused by the meshing engagement of the gear with a mating gear, where the chuck is used on a testing, lapping, burnishing, or shaving machine or the like. For all of these reasons, collet chucks have never come into extensive use in gear work.

One object of the present invention is to provide a collet type chuck which is so constructed that the fingers of the collet cannot be unduly expanded or sprung and a chuck in which the amount that the fingers can be expanded either with or without the work in place is definitely limited.

Another object of the invention is to provide a collet type chuck of the expanding type which is so constructed as to hold the work true at all times.

A further object of the invention is to provide a collet type chuck in which the rearward movement of the collet during the step of expanding the collet fingers to chucking position, operates to center the work accurately on the arbor or spindle on which the chuck is employed.

Another object of the invention is to provide a collet type chuck with which the work may be held securely; and any tendency of the work to turn or twist on the arbor under cutting or other thrusts is wholly overcome.

Still another object of the invention is to provide a collet type chuck which is completely protected against the possibility of chips, or grit, or dirt getting between the collet fingers and preventing proper operation of the chuck.

A further object of the invention is to provide a collet type chuck which is completely protected against chips, grit and dirt but which is at the same time so constructed that a work piece may be taken off or placed on the chuck without removing any part of the chuck.

Still another object of the invention is to provide a chuck mechanism of the character described which is so constructed that the need of a stripper or push-off device, in order to take a workpiece off of the chuck, is wholly obviated.

Other objects of the invention will be apparent hereinafter from the specification and from the recital of the appended claims.

In the drawings:

Fig. 1 is a longitudinal sectional view showing a chuck constructed according to one embodiment of this invention in use for holding a bevel gear, the view being taken substantially on the line 1—1 of Fig. 2;

Figure 3:
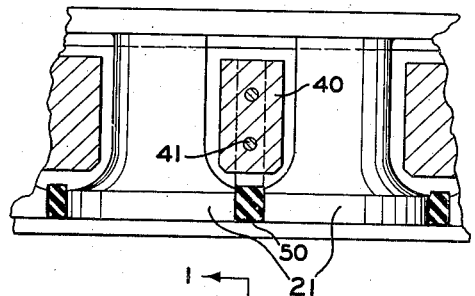
Fig. 3 is a fragmentary sectional view taken substantially on the line 3—3 of Fig. 2 and looking in the direction of the arrows.

Referring to the drawings, 10 denotes a tapered sleeve or arbor which is adapted to be mounted in the work spindle of the machine on which the chuck is to be used. This arbor is held in the spindle by friction and has a threaded portion, as denoted at 11, for receiving a spanner nut which is adapted to abut the face of the spindle and by means of which the arbor may be dismounted from the spindle. The arbor also has an enlarged head or nose, designated 12. All this is conventional structure. Secured to the head or nose of the arbor, as by means of screws 13, is the body or seating portion 15 of the chuck. For rough-cutting gears, these screws may be made long enough to bolt the chuck body 15 directly to the work spindle but for a finish-cutting, testing, lapping, burnishing or similar operation, it is ordinarily sufficient, as shown, to bolt the chuck body only to the arbor.

Figure 2:
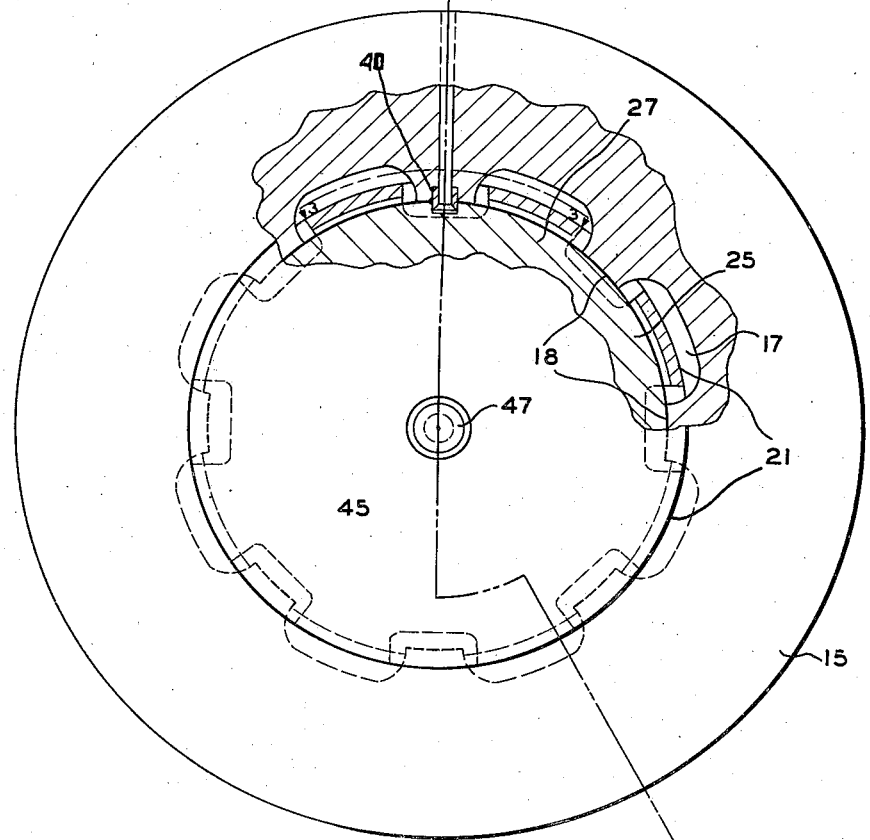
Fig. 2 is a view substantially on the line 2—2 of Fig. 1, parts being broken away.

The part 15 is of pot or cup-shape, and the side wall of its bore 16 is scalloped, as clearly shown in Fig. 2, to form alternate recesses 17 and lands or bearing portions 18.

Mounted for axial movement within the bore 19 of the arbor 10 is a collet 20. This collet has a sleeve portion which fits slidably into the bore 19 of arbor 10. The sleeve portion terminates at its forward end in an enlarged head or flange 34 from the periphery of which the expansible gripping fingers 21 project forwardly. These fingers are so arranged as to lie in the recesses 17 of the chuck body or seating member 15. The collet may be said to be, therefore, generally cup-shaped at its front end, having a base at 34 and a side wall formed by the fingers 21. The tubular or centering portion of the collet extends rearwardly from the flange or collar 34.

The gear G or other workpiece, which is to be chucked, is mounted with its back face seated against the front face of the chuck body 15, and the gripping fingers 21 of the collet are adapted to project forwardly beyond the front face of the chuck body and engage within the bore of the gear to hold the gear on the part 15.

The collet fingers 21 are adapted to be expanded to grip and clamp the gear or other work piece to the member 15 by an expander 25. This expander has an enlarged head at its front end and a rearwardly extending stem. The stem portion 26 of this member is mounted within the sleeve portion of the collet 20 and has a bearing portion 29 adjacent its rear end by which it is centered within the bore 19 of the arbor 10. The stem 26 may be threaded at its rear end, as denoted at 28, so as to be connected to a standard drawbar (not shown). The drawbar is, of course, adapted to be mounted within the bore of the work spindle of the machine and may be actuated manually, mechanically, or by fluid pressure to effect movement of the expander 25, and chuck or release the work.

The expander head is of generally cylindrical shape but has a conical surface 27 at its front end which is adapted to engage the inside surfaces of the collet fingers 21 to expand these fingers into gripping position. The inside surfaces of the fingers may be made slightly tapered adjacent the outer ends of the fingers, as shown in Fig. 1, so as to render the action of the expanding surface 27 more effective. The cylindrical portion of the head of the expander 25 contacts with and bears against the lands 18 of the chuck body 15 so that these lands serve to center and guide the expander in its movement. The lands 18 engage the expander quite close to the operating surface 27 of the expander. By means of these lands, then, and the bearing portion 29, the expander is held true and central with the bore of arbor 10 throughout the whole of its movement to insure accurate centering of the work on the arbor and work spindle.

Mounted within the bore 19 of the arbor 10 is a coil spring 30. This spring seats at one end against a shoulder formed within the bore 19 and at its opposite end against the rear face of the sleeve portion of the collet 20. This spring serves to force the collet normally forward. Forward movement of the collet is limited, however, by the heads 31 of the screws 32. These screws pass through holes in the flange 34 of the collet and thread into the chuck body 15. The spring 30 tends to force the collet forward to close the gap D between the front face of the collar or flange 34 of the collet and the rear face 35 of the expander head. This tends, of course, to expand the gripping fingers 21. The amount of forward movement of the collet is, however, limited by the heads of the screws 31 and the movement of the collet can never be greater than the distance D. The heads 31 of screws 32 fit into recesses 33 in the rear face of the expander head.

As already indicated, during cutting of a gear, for instance, a spiral bevel or a hypoid gear with a face-mill cutter, there is a tendency for the work to be rotated on its axis by the cutting thrusts as the cutting blades travel across the face of the work. Unless the work is held securely against these thrusts, the gear teeth cannot be cut accurately. One of the features of the collet chuck of the present invention is the provision of means close to the work, that is, close to the point of the cutting thrusts to hold the work securely against these cutting thrusts. In the embodiment of the invention illustrated in the drawings this takes the form of a key, denoted at 40, which is secured by screws 41 to the chuck body 15 and which engages in an elongated key slot 42 formed in the periphery of the head of the expander 25. This key holds the expander against rotation while permitting reciprocation of the expander in operation of the chuck. This key is located right at the head of the expander so that any inclination of the cutting thrusts to twist the expander or collet or the work is offset.

As previously stated, one of the difficulties encountered with collet type chucks heretofore when used on a cutting machine, such as a gear cutting machine, was the tendency of the chips formed in the cutting operation to get in between the fingers of the collet and prevent proper operation of the collet fingers. This difficulty is wholly obviated with the present invention. A cover or guard plate 45 is provided to fit tightly over the outer or forward ends of the gripping fingers 21. This cover is provided with a hub portion 48 to fit and slide in a recess formed centrally with the head of expander 25. The cover is resiliently held in place by a coil spring 46 which is mounted within a recess formed in the hub portion of the cover and which is interposed between the bottom of that recess and the head of a screw 47 that threads into the head of expander 25. This construction insures that the cover plate 45 is always held in position and that it rides with the collet and is held as tightly as possible against the outer faces of the collet fingers.

To further protect the chuck from chips and dirt and grit, blocks of neoprene or similar material are mounted between the gripping fingers 21 in position to engage the outer surfaces of the expander and the bore of the work. These pieces do not have to be glued or cemented in place. A piece of neoprene or similar elastic material, which is slightly oversize, can be drawn between the fingers of the collet and then trimmed to shape. It will be held in place under pressure, but its elasticity will permit the expansion and contraction of the collet fingers required for operation of the chuck. Neoprene is, of course, impervious to oil. A complete, lasting seal is, therefore, provided against entry of dirt, grit or chips between the fingers of the collet.

The chuck is shown at Fig. 1 in chucking position. To release it, the expander 25 is moved forwardly by operation of the drawbar of the machine. It will be noted that the cover plate 45, while large enough to cover the gripping fingers, is no larger in diameter and preferably is slightly smaller in diameter than the bore of the work so that when the gripping fingers are released, the work can be lifted off of the chuck without the removal of any part of the chuck from the machine, and that a new workpiece can be placed in the same way.

Because the collet fingers are expanded to grip the bore of the work, it is not necessary to hold the diameter of the bore of the work with the same accuracy that has been required where other types of chucks have been used. It will be noted, too, that since the collet fingers collapse when the expander is moved forward, and that since the collet is forced forward by spring 30 to follow the expander in its dechucking, forward movement, the capillary adhesion between the back of the gear, which tends to move forward with the collet, and the front face of the chuck body 15 is broken. Thus, the work can easily be lifted off of the chuck body when dechucked; so that no ejector or push-off device is required. It will be further noted that the work is held true by the chuck of this invention, being centered coaxially of the work spindle of the machine at all times due to the fact that the expander itself is properly centered at all times.

Further than this, with the construction of the present invention, it is impossible to expand the collet fingers more than a limited distance; they cannot be sprung to an extent to put a permanent strain in them. The collet can never be moved more relative to the expander than the distance D; outward movement of the collet, under pressure of the spring 30 is limited by the heads 31 of the screws 32, while rearward movement of the expander 25 is limited by the contact of the rear face 35 of the expander head with the front face of the collet collar or flange 34, the rear face of the collet body seating against the front face of the base portion of the chuck body 15.

When a workpiece is to be chucked, the chuck is, of course, in released position, which means that the expander 25 is forward from the position shown in Fig. 1. The workpiece is slipped over the cover plate 45 and over the released, collapsed gripping fingers 21. Then the drawbar is moved rearwardly to pull the expander rearwardly causing the conical surface 27 of the expander head to force the collet fingers outwardly. In the first part of the rearward movement of the expander, the collet itself moves rearwardly with the expander, centering the work and insuring that the back face of the gear is straightened up against the front face of body member 15. When the rear face of the flange portion 34 of the collet has seated, however, against the chuck body 15, then the conical surface 27 of the expander head, in the further rearward movement of the expander, forces the collet fingers into gripping position in the bore of the work to hold the work securely on the arbor.

The chuck of the present invention is simpler in operation, cheaper in construction, requires less labor on the part of the operator, and obviates entirely the possibility of his cutting his fingers with chips. This chuck can be used on any type of machine for holding gears whether a gear cutting, a gear grinding, a gear lapping, a gear burnishing, a gear shaving, or a gear testing machine. It is not limited, however, to use in the chucking of gears, but it may be used for any chucking operation where the workpiece has a bore by which it may be held. It will further be understood that, while a particular embodiment of the invention has been described and illustrated, the invention is capable of further modification and use, and that the present application is intended to cover any variations, uses, or adaptations of the invention following, in general, the principles of the invention, and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A chuck comprising a member against which the work is adapted to be seated, an expansible collet, an expander having an enlarged head mounted within the collet and a rearwardly projecting stem by which it may be axially reciprocated therein, the head of the expander having a tapered external surface and being adapted on movement of the expander in one direction to expand the collet in the bore of the work, and means for guiding and centering the head of the expander in its movement.

2. A chuck comprising a member against which the work is adapted to be seated, an expansible collet, an expander having an enlarged head mounted within the collet and a rearwardly projecting stem by which it may be axially reciprocated therein, the head of the expander having an externally tapered surface and being adapted on movement of the expander in one direction to expand the collet into the bore of the work to chuck the work, means for engaging the head of the expander to guide and center the expander in its movement, and means for engaging the head of the expander close to the point of engagement of the head with the collet to prevent rotation of the expander and collet.

3. A chuck comprising a member against which the work is adapted to be seated, an expansible collet, an expander mounted within the collet for axial reciprocation and adapted, when moved in one direction, to expand the collet within the bore of the work, and means projecting between the fingers of the collet and secured to the first named member and engaging the expander to guide and center the expander in its movement.

4. A chuck comprising a member against which the work is adapted to be seated, an expansible collet having a plurality of gripping fingers, an expander mounted within the collet for axial reciprocation and adapted, when moved in one direction, to expand the gripping fingers into the bore of the work to chuck the same, means integral with the first named member and projecting between the fingers of the collet to engage the expander and guide and center the expander in its movement, and a key secured to the first named member and engaging within a slot formed on the periphery of the expander to hold the expander against rotation.

5. A chuck comprising a generally cup-shaped body member against which the work is adapted to be seated, a collet mounted in the recess of the body member and having a plurality of expansible gripping fingers, an expander mounted within the collet for axial reciprocation and having an enlarged head and a rearwardly extending stem which is adapted to be secured to a drawbar to move the expander axially, the head of the expander being of generally cylindrical shape but having a tapering surface adjacent its front end to engage the insides of the gripping fingers to expand said fingers into the bore of the work on rearward movement of the expander, and means engaging the cylindrical portion of the expander head to hold the expander against rotation.

6. A chuck comprising a generally cup-shaped body against which the work is adapted to be seated, a collet mounted in the recess of the body member and having a plurality of expansible gripping fingers, an expander mounted within the collet for axial reciprocation and having an enlarged head and a rearwardly extending stem which is adapted to be secured to a drawbar to move the expander axially, the head of the expander being of generally cylindrical shape but having a tapering surface adjacent its forward end to engage the insides of the gripping fingers to expand them into the bore of the work on rearward movement of the expander, means engaging the cylindrical portion of the expander head to hold the expander against rotation, and means engaging the cylindrical portion of the expander head to guide the expander in its axial movement.

7. A chuck comprising a generally cup-shaped body member against which the work is adapted to be seated, an expansible collet mounted in the recess of the body member and having a plurality of gripping fingers, an expander mounted within the collet for axial reciprocation and having an enlarged head and a rearwardly extending stem which is adapted to be secured to a drawbar to move the expander axially, the head of the expander being of generally cylindrical shape but having a tapering surface adjacent its forward end which is adapted to engage the inside surfaces of the collet fingers to expand the fingers into the bore of the work on rearward movement of the expander, the boundary wall of the recess in the body member being scalloped to provide recesses in which the fingers of the collet lie and to form bearing lands between said recesses which project between the fingers of the collet and engage the cylindrical portion of the periphery of the expander head to center and guide the expander in its movement.

8. A chuck comprising a generally cup-shaped body member against which the work is adapted to be seated, an expansible collet mounted in the recess of the body member and having a plurality of gripping fingers, an expander mounted within the collet for axial reciprocation and having an enlarged head and a rearwardly extending stem which is adapted to be secured to a drawbar to move the expander axially, the head of the expander being of generally cylindrical shape but having a tapering surface adjacent its forward end which is adapted to engage the inside of the collet fingers to expand the fingers into the bore of the work on rearward movement of the collet, the boundary wall of the recess of the body member being scalloped to provide recesses in which the fingers of the collet lie and to form bearing lands between said recesses which project between the fingers of the collet and engage the cylindrical portion of the periphery of the expander head to center and guide the expander in its movement, and a key secured to one of said lands and engaging in a slot formed in the cylindrical portion of the expander head to hold the expander against rotational movement.

9. A chuck comprising a member against which the work is adapted to be seated, an expansible collet mounted in said member for axial reciprocatory movement therein and having a tubular rear portion terminating at its forward end in a flange from which a plurality of expansible gripping fingers project forwardly, an expander having an enlarged head and a rearwardly projecting stem, the stem being mounted to reciprocate in the tubular portion of the collet and the head of the expander being mounted inside the collet fingers to expand the fingers on rearward movement of the expander, a coil spring operatively connected to the tubular portion of the collet and adapted normally to press the collet forward, and a headed stop member passing through a hole in the flange of the collet and adjustably threaded into the first-named member, the head of said stop member being adapted to limit forward movement of the collet.

10. A chuck comprising a member against which the work is adapted to be seated, an expansible collet having a plurality of gripping fingers, an expander mounted within the collet to be movable rearwardly to expand the gripping fingers, means for normally urging the collet forwardly, means adapted to engage the collet to limit the forward movement of the collet, and means to limit the rearward movement of the expander.

11. A chuck comprising a collet having a plurality of expansible gripping fingers, a movable expander for expanding the gripping fingers into the bore of an article which is to be chucked, and a circular cover member connected to one of said parts to move therewith and adapted to extend over the front face of the expander and over the front faces of the gripping fingers to prevent entry of grit or chips between the fingers, the diameter of the cover plate being no greater than the expanded diameter of the gripping fingers whereby to permit removal from or placing of an article on the chuck without removal of the cover plate.

12. A chuck comprising a collet having a plurality of expansible gripping fingers, a movable expander for expanding the gripping fingers into the bore of an article which is to be chucked, a cover member connected to one of said parts to move therewith and adapted to extend over the front face of the expander and of the gripping fingers to prevent entry of dirt or chips between the gripping fingers, and blocks of elastic material mounted between the gripping fingers to further prevent entry of dirt or chips between the fingers, the diameter of the cover plate being no greater than the expanded diameter of the gripping fingers whereby to permit removal from or placing of an article on the chuck without removal of the cover plate.

13. A chuck comprising a cup-shaped body member against which the work is adapted to be seated, a collet mounted within the recess of the body member and having a plurality of gripping fingers, an expander mounted within the gripping fingers and adapted to be moved rearwardly therein to expand the fingers to grip the bore of the work, a cover plate resiliently secured to the expander and adapted to cover the front ends of the gripping fingers, means for resiliently urging the collet forwardly, means for limiting movement of the collet in both directions, and means for limiting rearward movement of the expander.

JOSEPH M. PETERS.

REFERENCES CITED

The following references are of record in the file of this patent:

UNITED STATES PATENTS

| Number | Name | Date |
| --- | --- | --- |
| 1,441,284 | Johnson et al. | Jan. 9, 1923 |
| 1,611,439 | Havlick | Dec. 21, 1926 |
| 1,830,649 | Evans | Nov. 3, 1931 |
| 1,930,669 | Varcoe et al. | Oct. 17, 1933 |
| 2,277,816 | Braun | Mar. 31, 1942 |
| 2,376,594 | Hite | May 22, 1945 |